United States Patent
Bedingfield, Sr.

(10) Patent No.: US 7,920,580 B2
(45) Date of Patent: *Apr. 5, 2011

(54) COORDINATED MULTI-NETWORK DATA SERVICES

(75) Inventor: James Carlton Bedingfield, Sr., Lilburn, GA (US)

(73) Assignee: AT&T Intellectual Property I, LP., Reno, NV (US)

( * ) Notice: Subject to any disclaimer, the term of this patent is extended or adjusted under 35 U.S.C. 154(b) by 72 days.

This patent is subject to a terminal disclaimer.

(21) Appl. No.: 12/470,068

(22) Filed: May 21, 2009

(65) Prior Publication Data
US 2009/0232149 A1   Sep. 17, 2009

Related U.S. Application Data

(63) Continuation of application No. 11/012,791, filed on Dec. 15, 2004, now Pat. No. 7,558,277.

(51) Int. Cl.
*H04L 12/28* (2006.01)
*H04L 12/56* (2006.01)

(52) U.S. Cl. ........................ 370/401; 370/466

(58) Field of Classification Search ........................ None
See application file for complete search history.

(56) References Cited

U.S. PATENT DOCUMENTS

| 5,677,905 | A  | * | 10/1997 | Bigham et al. ........... 370/395.21 |
| 6,002,722 | A  |   | 12/1999 | Wu |
| 7,204,746 | B2 | * | 4/2007  | Purkayastha et al. ...... 455/552.1 |
| 2002/0118676 | A1 |   | 8/2002  | Tonnby et al. |
| 2004/0252675 | A1 |   | 12/2004 | Lund |
| 2005/0220084 | A1 |   | 10/2005 | Parker et al. |
| 2006/0023695 | A1 |   | 2/2006  | Yarlagadda et al. |
| 2006/0174022 | A1 |   | 8/2006  | Janning et al. |

OTHER PUBLICATIONS

Green, *The Irwin Handbook of Communications*, 4$^{th}$ edition, McGraw Hill, 2000.

* cited by examiner

*Primary Examiner* — Ajit Patel
(74) *Attorney, Agent, or Firm* — Myers Bigel Sibley & Sajovec, P.A.

(57) ABSTRACT

Content and/or services are provided for a session to a user by controlling use of at least two different networks to deliver the content and/or services for the session to the user. The at least two different networks have different data transfer characteristics. Control of use of the at least two different networks is based on the data transfer characteristics of the at least two different networks and characteristics of the content and/or services for the session to the user.

20 Claims, 7 Drawing Sheets

COORDINATED MULTI-NETWORK DATA SERVICES

CROSS-REFERENCE TO RELATED APPLICATION

This application is a continuation of U.S. application Ser. No. 11/012,791, filed Dec. 15, 2004, now U.S. Pat. No. 7,558,277 the disclosure of which is hereby incorporated herein by reference in its entirety as if set forth fully herein.

FIELD OF THE INVENTION

This invention relates to data services and more particularly to the delivery of data services.

BACKGROUND OF THE INVENTION

The delivery of data services to customer premises, such as a residence or business, has typically been provided by one or more networks, such as the telephone network or cable network. Typically, these networks are provided in an uncoordinated manner such that the telephone network does not know of the existence of the cable network and the cable network does not know of the existence of the telephone network. In fact, these different network technologies are often viewed as competing and network services companies, such as cable operators or telephone companies, have expended considerable effort on converging different types of data delivery onto a single network. Thus, for example, cable networks may provide analog and digital video data and broadband data over a cable network. This convergence has even extended to providing voice services utilizing voice over IP (VOIP) using a broadband cable connection.

Some efforts have been made to use different communications technologies in an integrated manner. For example, some cable and satellite set-top boxes have an analog dial-up connection that is used to do pay per-view billing and program set-up. Furthermore, efforts have been made to use multiple networks for improved performance. For example, Digital Subscriber Loop (DSL) architects (and Integrated Service Digital Network (ISDN) system designers before them) use a mechanism called bonding, which combines two DSL, circuits to provide increased bandwidth for a single customer. Furthermore, personal video recorders, such as TiVo™, may receive video signals from a number of different sources, such as satellite or a cable television network, and receive guide data over a network connection to the Internet or a dial-up connection over a phone line. Also, U.S. Pat. No. 6,002,722 describes a multimode digital modem where voice-band (e.g., V.34), DSL, cable, terrestrial and other wireless, and/or satellite modems are implemented simultaneously by the same digital signal processor (DSP) device.

SUMMARY OF THE INVENTION

Some embodiments of the present invention provide methods and/or systems for providing content and/or services for a session to a user by controlling use of at least two different networks to deliver the content and/or services for the session to the user. The at least two different networks have different data transfer characteristics. Control of use of the at least two different networks is based on the data transfer characteristics of the at least two different networks and characteristics of the content and/or services for the session to the user. The session data transmission requirements may be determined from information in the session control protocol. Alternatively or additionally, the session data transmission requirements may be determined using a Universal Resource Locator (URL), an Internet Protocol (IP) address or other identifier. Session data transmission requirements could also be determined dynamically by observing traffic characteristics.

In particular embodiments of the present invention, the at least two different networks comprise a cable television distribution network and a digital subscriber loop (DSL) network.

Furthermore, controlling use may include dividing communications to deliver the content and/or services for the session to the user into a first type of communications to be communicated over a first of the at least two networks and a second type of communications to be communicated over a second of the at least two different networks, communicating the first type of communications over the first network and communicating the second type of communications over the second network. In some embodiments, controlling use further includes determining a characteristic of the session and selecting a predefined use of the networks based on the characteristic of the session, wherein the predefined use is established based on the characteristics of the networks. In other embodiments, controlling use further includes determining a characteristic of the session, dynamically determining a characteristic of at least one of the networks and dynamically specifying use of the networks based on the characteristic of the session and the dynamically determined characteristic of the at least one of the networks.

Further embodiments of the present invention include receiving the first type of communications over the first network, receiving the second type of communications over the second network and combining the first and second type of communications to deliver the content and/or services for the session. Furthermore, the first type of communications may request and/or control the delivery of the second type of communications.

In further embodiments of the present invention, controlling use includes controlling the operation of at least one of the two networks. For example, where the at least one of the two networks include a digital subscriber loop (DSL) network, controlling operation may include controlling the allocation of upstream and downstream bandwidth for a DSL network connection.

In additional embodiments of the present invention, controlling use further includes converting a format of communications and/or converting content of the communications.

Some embodiments of the present invention provide a system for providing data services that includes a multi-network coordinator configured to control use of at least two networks to deliver content and/or services for a session to a user. The at least two networks have different data transfer characteristics. The use of the at least two networks is controlled based on the data transfer characteristics of the at least two networks and characteristics of the session to the user. Multi-network customer premises equipment is configured to communicate over the at least two networks and is operatively associated with the multi-network coordinator to control the use of the at least two networks with the multi-network coordinator to provide the content and/or services for the session to the user.

In further embodiments of the present invention, the multi-network coordinator is further configured to determine use of the networks and communicate the use of the networks to the multi-network customer premises equipment. The multi-network customer premises equipment may be further configured to determine use of the networks and communicate the use of the networks to the multi-network coordinator. The use of the networks may be predefined based on characteristics of the session. The use of the networks could be dynamically established based on operating conditions of the networks and characteristics of the session.

In particular embodiments of the present invention, the at least two networks include a digital subscriber loop network and a cable distribution network.

In additional embodiments of the present invention, at least one of the network coordinator and the customer premises equipment is further configured to convert a format of communications and/or convert the content of communications.

In some embodiments of the present invention, the network coordinator includes a content/services provider interface configured to communicate with content/service providers, a cable network interface configured to communicate with a cable network distribution system, a telco system interface configured to communicate with a digital subscriber loop (DSL) network system and a processor configured to control communications between the content/services provider interface, the cable network interface and the telco system interface. The customer premises equipment may include a cable modem, a DSL modem, a local area network interface, a video interface and a processor configured to control communications between the cable modem, DSL modem, local area network interface and video interface.

Some embodiments of the present invention provide a multi-network coordination device, comprising means for determining characteristics of a session to a user, means for controlling communications on at least two different networks and means for controlling the means for controlling communications based on characteristics of the at least two networks and the determined characteristics of the session to provide content and/or services for the session to the user over the at least two different networks.

The multi-network coordination device may comprise multi-network customer premises equipment. The multi-network coordination device may comprise a multi-network coordinator.

Other systems, methods, and/or computer program products will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and/or flowcharts of methods, systems, cards and computer program products according to embodiments of the invention. It will be understood that a block of the block diagrams and/or flowcharts, and combinations of blocks in the block diagrams and/or flowcharts, may be implemented at least in part by computer program instructions. These computer program instructions may be provided to a processor in multi-network customer premises equipment or a multi-network coordinator, such that the instructions, which execute via the processor create means, modules, devices or methods for implementing the functions/acts specified in the block diagram block or blocks.

These computer program instructions may also be stored in a memory in the multi-network customer premises equipment or a multi-network coordinator that can direct a processor of a multi-network customer premises equipment or a multi-network coordinator to function in a particular manner, such that the instructions stored in the memory produce an article of manufacture including computer-readable program code which implements the functions/acts specified in block diagram and/or flowchart block or blocks. The computer program instructions may also be loaded onto a processor of multi-network customer premises equipment or a multi-network coordinator to cause a series of operational steps to be performed by the multi-network coordinator or customer premises equipment to produce a computer implemented process such that the instructions which execute on the processor provide steps for implementing the functions/acts specified in the block diagram and/or flowchart block or blocks.

Figure 1:
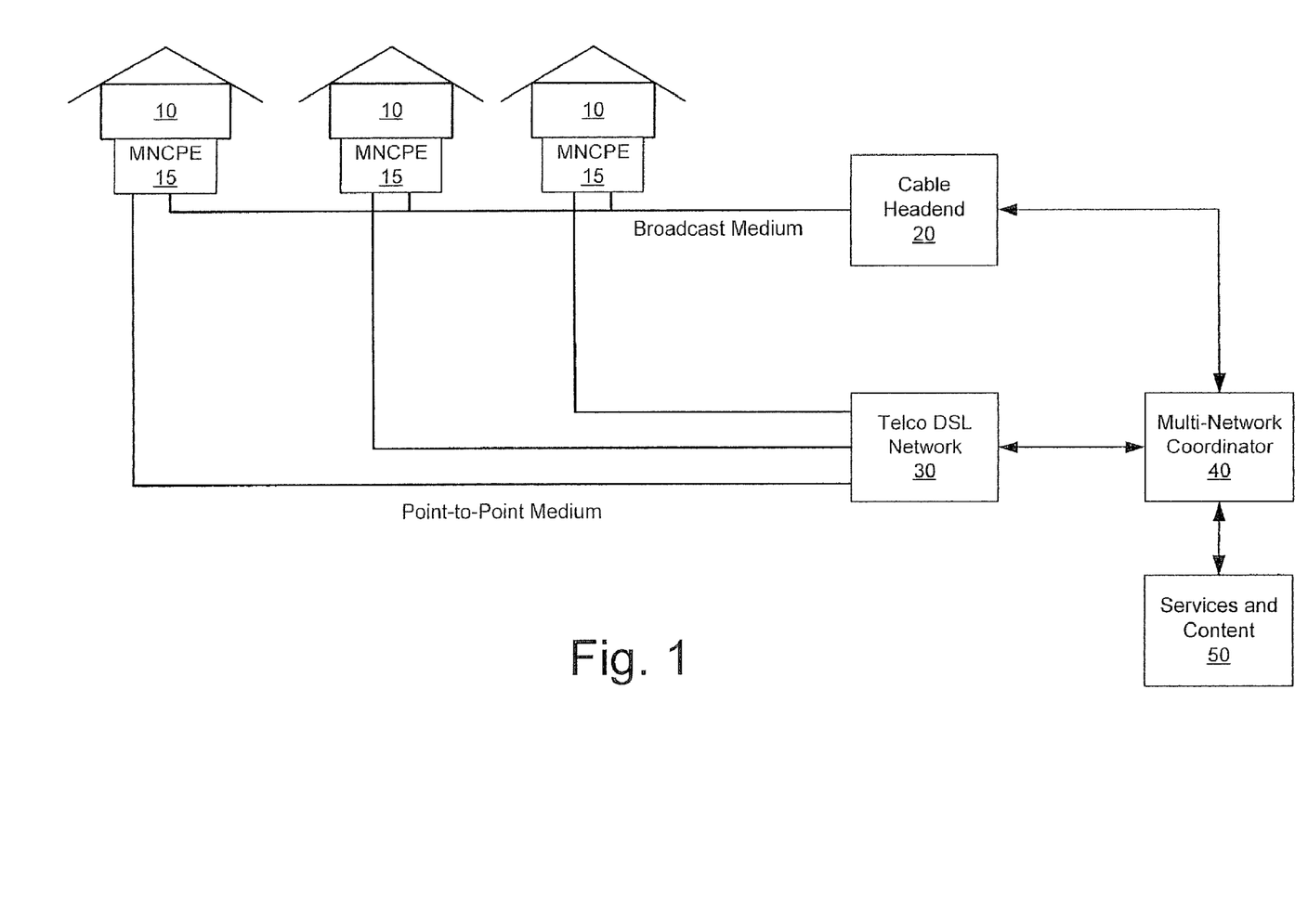
FIG. 1 is a block diagram of a coordinated multi-network data service system according to some embodiments of the present invention.

Coordinated multi-network data service systems and methods according to some embodiments of the present invention are illustrated in FIG. 1. As seen in FIG. 1, customer premises 10, such as a residence and/or business, are provided with multi-network customer premises equipment (MNCPE) 15 that coordinates the use of at least two networks having different characteristics, such as a broadcast medium, for example, cable television distribution network, and a point-to-point medium, such as a digital subscriber loop (DSL) network. While two networks are illustrated in FIG. 1, other numbers of networks may be utilized. Likewise, while a single instance of each type of network is illustrated in FIG. 1, multiple instances of the same type network may also be provided. Furthermore, additional types of networks, such as wireless data and/or telephony networks, satellite television or radio networks, wired telephony, local area networks (LANs) or wide area networks (WANs) may also be utilized. Accordingly, embodiments of the present invention should not be construed as limited to the particular configuration illustrated in FIG. 1 but may be used with any combination of networks that have different operating characteristics. Thus, for example, embodiments of the present invention may be utilized with a satellite network and a DSL network but would not be utilized with only two DSL networks or two cable television networks where the networks have the same characteristics. Such would be the case even if, for example, the two DSL networks had different throughput characteristics. Thus, embodiments of the present invention are directed to the coordination of two different networks where the differences in the network are structural, e.g., broadcast versus point-to-point or wired versus wireless, rather than instance specific, e.g., different throughput.

For example, with multiple video feeds into a residence, a DSL network can be used to present program selections and to receive user instructions (channel selections, picture-in-picture selections, data overlay requests) while the high bandwidth of the cable connection is used to deliver content. The DSL connection may be used to indicate to multi-network customer premises equipment (MNCPE) the channels that should be delivered to each user within the residence. Also, on-demand video could be provided by the DSL connection being used to negotiate the transaction with the user, to validate the billing arrangements and digital rights, and to assign one or more high-speed channels for content delivery.

Full resolution video chat could also be provided. The typical 1.5M/128K DSL connection can be reversed to provide high bandwidth upstream connection to send the user's video information, while the cable connection is used for the downstream video content.

Furthermore, mixed mode web browsing combining secure and non-secure information could be provided over different networks. Thus, for example, a secure connection could be established over the DSL network and secure communications transmitted and received over the point-to-point DSL network whereas communications not requiring security could be transmitted and received over the broadcast oriented cable network.

In addition to a combination of cable television and DSL networks, a satellite connection can be used to replace or supplement the cable connection. Dial-up and wide-band wireless connections can be used for back-up communications, or simply to increase the possible number of transport and control options. The architecture described herein can also be extended to address in-house distribution of information services. An MNCPE device could be incorporated into every delivery device (TV, PC, etc.) to provide even more granular management of control and content transport. Furthermore, the coordination of multiple networks could be implemented by a single service provider who has control of both the DSL and cable service to a residence. However, the coordination service could be offered by a service provider who purchases cable, DSL, satellite access or other network access on a wholesale basis, then "tunnels through" them to provide coordination with the MNCPE.

The MNCPE 15 illustrated in FIG. 1 coordinates the use of the multiple networks to which it has access by dividing outgoing communications over the networks and by combining incoming communications from the networks to take advantage of the characteristics of the networks. While a single MNCPE 15 is illustrated at each premises 10 in FIG. 1, multiple MNCPEs 15 may be provided at a single premises 10. As used herein, dividing communications includes providing some communications over two or more of the multiple networks or providing all communications over a single network of multiple networks. Furthermore, a session for a user is used herein to refer to a group of related activities. For example, merely concurrent use of multiple networks by one or more devices would not be considered a session unless activities using one of the networks was dependent on an activity using another of the networks. Use of the multiple networks may be coordinated at the session level such that different sessions may use the networks differently. Accordingly, some embodiments of the present invention provide for the dynamic use of multiple networks based on characteristics of a session for a user or dynamic network characteristics.

As is further illustrated in FIG. 1, the broadcast medium, such as a cable television distribution network, may be controlled by a cable headend system 20. Similarly, the point-to-point medium, such as a DSL network, may be part of a telephone company (Telco) DSL network 30. Furthermore, the cable headend 20 and the Telco DSL network 30 may communicate with a multi-network coordinator 40 according to embodiments of the present invention. The multi-network coordinator 40 may communicate with content and/or services providers 50 to provide content and/or services over the multiple networks. Thus, the multi-network coordinator may provide a single point of access to the service and/or content providers 50 and transparently divide communications between the multiple networks for outgoing communications and combine the communications from the multiple networks for incoming communications from the multiple networks.

As an example, the MNCPE 15 connects to a cable headend 20 and a Telco DSL network. These networks have fundamentally different characteristics. For example, a typical cable network is high-speed, channelized and broadcast-oriented whereas a typical DSL network is medium speed, bidirectional by design and individualized. The MNCPE 15 and multi-network coordinator 40 may take advantage of these differences by including performance characteristic information describing all types of connected networks. The performance information may be a fixed parameter, or it may be dynamic to accommodate varying network loads. The MNCPE 15 and multi-network coordinator 40 communicate with each other across one or more of the interconnecting networks. With the performance knowledge and communication, they are able to utilize the networks to provide user interface functions, assignment of network resources (e.g., channels, bandwidth) for transport of information, maintenance, ordering and/or billing functions.

Figure 2:
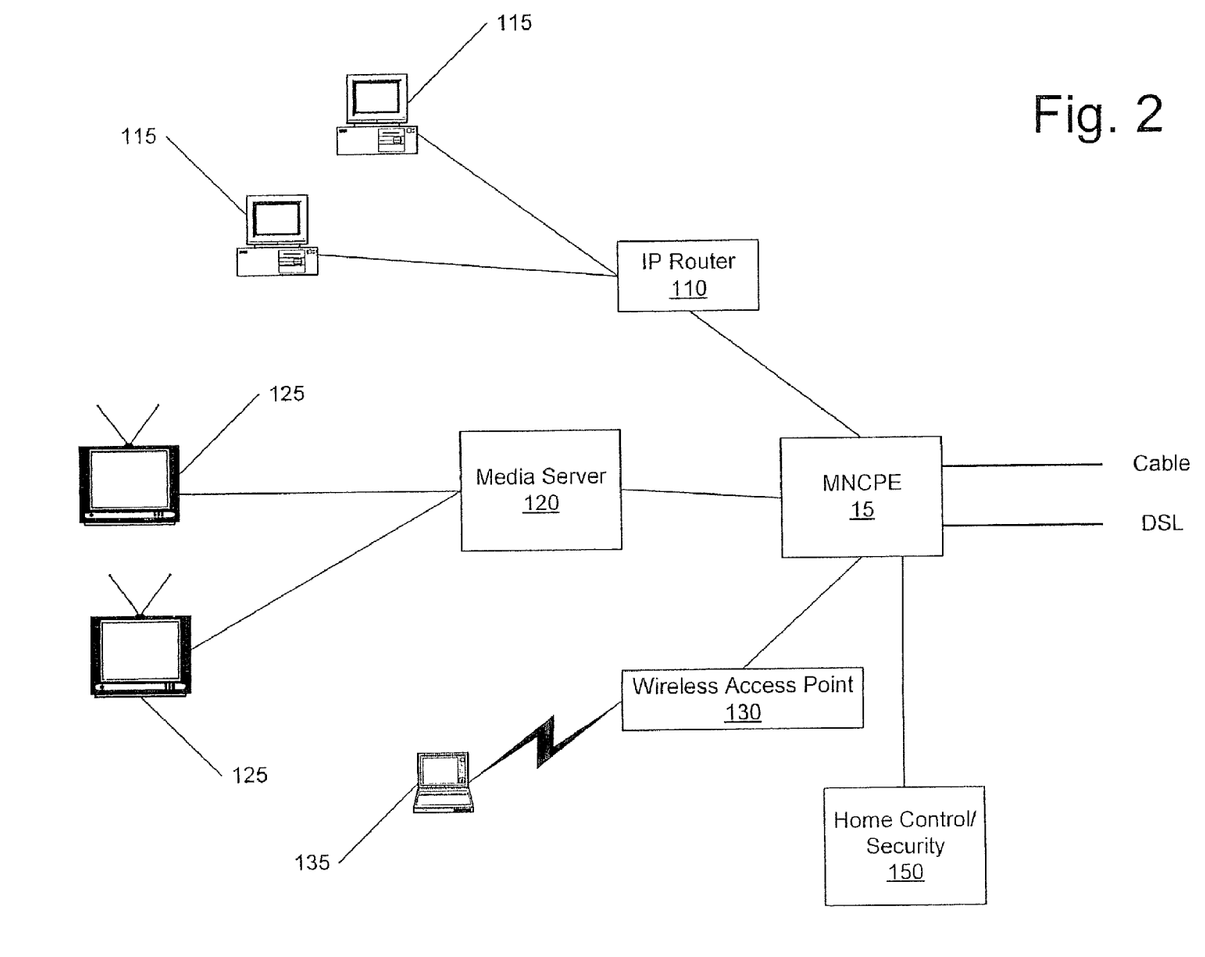
FIG. 2 is a block diagram of an exemplary customer premises system utilizing a coordinated multi-network data service system according to some embodiments of the present invention.

FIG. 2 is a more detailed block diagram of an exemplary customer premises 10. As seen in FIG. 2, the MNCPE 15 is connected to a cable network and a DSL network. The MNCPE 15 may also be connected to an Internet Protocol (IP) router 110, a media server 120, a wireless access point 130 and/or a home control/security system 150. Computers 115 may communicate with the MNCPE 15 through the IP router 110, televisions 125 may receive content from the media server 120, computers 135 with wireless networking capabilities may communicate through the wireless access point 130 and home automation systems and/or security systems may communicate through the home control/security system 150. Furthermore, devices, such as computers, televisions or the like may be directly connected to the MNCPE 15. While a particular configuration is illustrated in FIG. 2, other configurations may also be provided. For example, multiple IP routers 110 or no IP router 110 may be provided. Similarly, multiple media servers 120 or no media server 120 may be provided. Additionally, other devices, such as a multi-mode cellular telephone system that uses cellular and terrestrial communications, a voice over IP telephony system or other such additional devices that send or receive data over one or more of the multiple networks may be provided. Accordingly, embodiments of the present invention should not be construed as limited to the particular exemplary system illustrated in FIG. 2.

The MNCPE 15 may be a central access point for allowing various devices to communicate over the multiple networks. The MNCPE 15 may communicate with various devices, such as those illustrated in FIG. 2 and described herein, to provide communications over the multiple networks. Thus, the MNCPE 15 may provide a single point of access to the customer premises devices and transparently divide communications between the multiple networks for outgoing communications and/or combine the communications from the multiple networks for incoming communications from the multiple networks.

In a single MNCPE per premises system, when competing devices or session, such as a computer accessing the Internet and a media server recording a television program, concurrently use the multiple networks but would use the networks differently, the MNCPE 15 may coordinate the use of the network based on characteristics of one or more of the sessions. For example, in a single MNCPE system, if two devices with different uses of the system request use of the network, the MNCPE 15 could determine which of the competing requests would control the configuration or determine a compromise configuration. Such a determination may be made when a session starts and, in some embodiments, the use of the networks may be modified on-the-fly during a session if other sessions are started or end during an existing session.

Because the MNCPE 15 may make use of the networks transparent to the devices at the premises 10, the MNCPE 15 may alter the use of the networks during a session as long as such alteration is coordinated with the multi-network coordinator 40.

Furthermore, as discussed above, multiple MNCPEs 15 could be provided at a single residence. For example, MNCPEs 15 could be incorporated in specific devices, such as cable set top box, a personal video recorder or media server, and/or a computer, such as a desktop system or laptop system. In such a case, the MNCPEs 15 may need to coordinate use of the networks so that configuration and use of the networks is suitable for particular sessions associated with the multiple MNCPEs 15. In the multiple MNCPE 15 system, one of the MNCPEs 15 could be assigned as a master MNCPE and the other MNCPEs request control of the use of the multiple networks from the master MNCPE. Alternatively, a contention based system for arbitration of the control of the use of the multiple networks could be provided. In any event, the multiple MNCPEs may distribute information among themselves so that each is aware of the current use of the multiple networks and may conform their use to the current use. Such a distribution of information could also be used to provide the on-the-fly changes in network use as described above with reference to the single MNCPE system.

Figure 3:
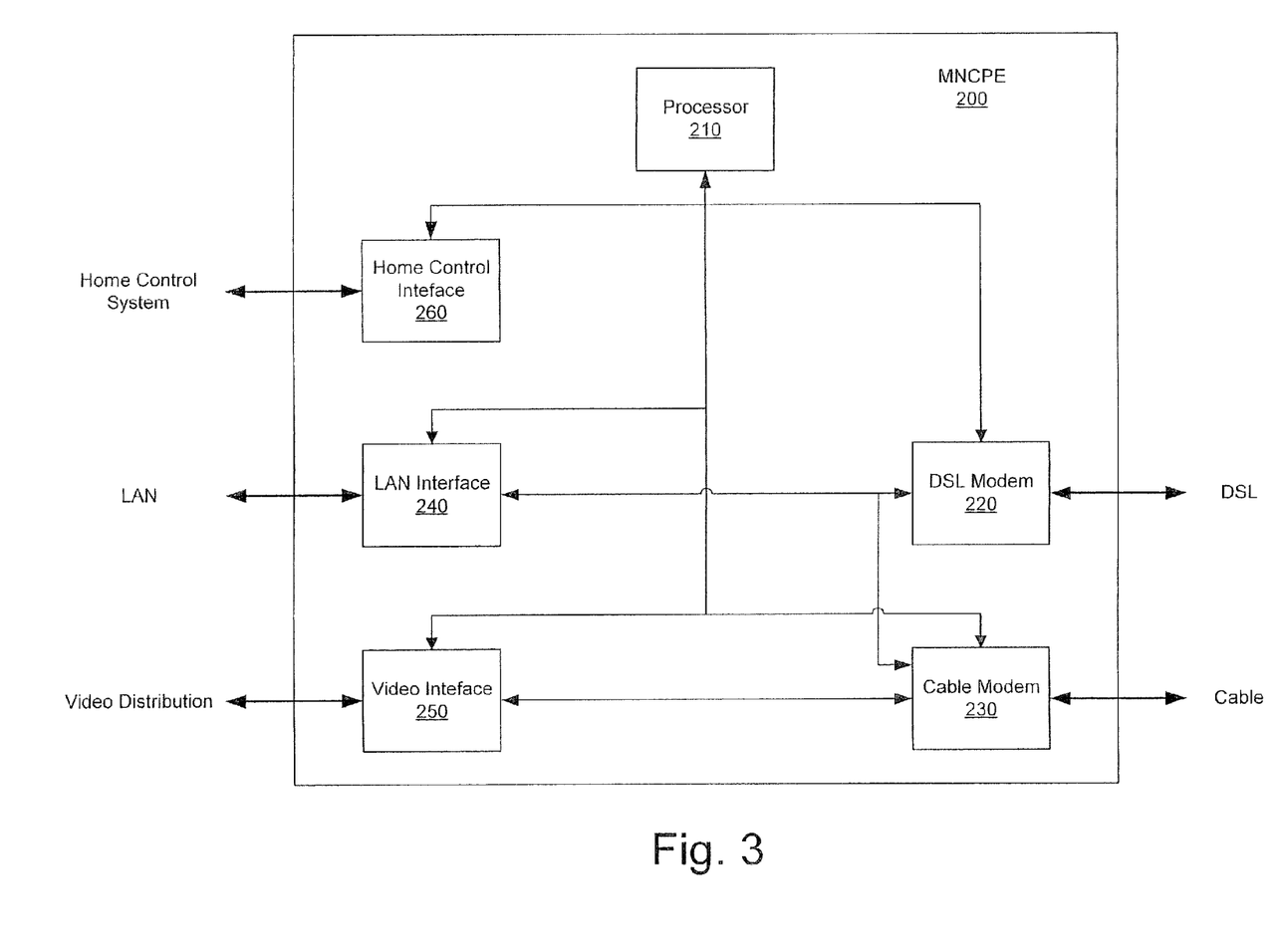
FIG. 3 is a more detailed block diagram of multi-network customer premises equipment according to some embodiments of the present invention.

FIG. 3 is a block diagram of an MNCPE 200 that may be suitable for use as an MNCPE 15 illustrated in FIGS. 1 and 2. In particular, the MNCPE 200 may include a DSL modem 220 that communicates over a DSL network and a cable modem 230 may be provided for communicating over a cable network. The cable modem may be accessed either digitally to utilize the cable modem as a broadband digital system or video signals between the cable distribution system and the video distribution system of the premises may be passed through the cable modem 230 without modification. Thus, for example, if a cable modem 230 was attached to the video distribution system of the premises, the signals could be passed through the cable modem 230 to the cable distribution network. Likewise, video signals from the cable distribution system could be passed through the cable modem 230 for distribution on the video distribution system of the premises. A home control interface 260 may also be provided to provide access to home automation/security systems access to/from the networks.

A LAN interface 240 may also be provided to provide a LAN access to/from the networks. The LAN interface 240 may, in some embodiments, be provided by a router or other firewall device that may provide additional functionality, such as IP address assignments and network address translation. Alternatively, in some embodiments, the MNCPE 200 may function as a network attached device where its IP address is assigned by another device or may be statically defined. Additionally, the MNCPE 200 could be accessed by other devices through the LAN interface 240. As is illustrated in FIG. 3, in some embodiments, the LAN interface 240 may communicate directly with the DSL modem 220 or the cable modem 230 to access the networks or may access the networks through the processor 210 as described in further detail below.

A video interface 250 may also be provided to provide a video distribution system access to/from the networks. The video interface 250 may, in some embodiments, be provided by a video amplifier and, in some embodiments, by a bidirectional amplifier, splitter, tuner(s), modulator(s) or other interface to the video distribution system of the premises. Furthermore, the video interface 250 may receive or provide video signals to/from the processor 210 as described below. Additionally, the video interface 250 may also provide digital or analog distribution of video signals including, for example, Digital Video Interface (DVI) signals that may be generated by the processor 210 or may be generated from video signals received from the cable distribution system. Thus, for example, the video interface 250 may, in some embodiments, function as a cable set top box and translate video signals from the cable distribution system or the processor 210 to a format that may be displayed and/or recorded on a video display or recording device.

In some embodiments, the content/services provided by various networks may be provided directly to the networks at the premises without passing through the MNCPE 200. For example, television signals may be provided directly to a cable distribution system at the premises. However, the MNCPE 200 may be used to control aspects of the television signals, such as what channel a television signal is provided on, by communicating with the multi-network coordinator 40 to control a cable headend to, for example, select the source signals that are distributed on the cable network and/or the channels on which the source signals are distributed.

A processor 210 may include a microprocessor, digital signal processor, analog to digital converters, video and/or audio encoders and/or decoders, or other such hardware for converting between digital and analog video and/or audio as well as hardware to allow access to the processor over the LAN interface 240 or the video interface 250 or through the DSL modem 220 or cable modem 230. The processor 210 may also include storage to, for example, buffer communications and/or provide workspace for transformations or the like. The storage may be volatile and/or non-volatile memory and may include storage devices such as hard drives or the like. In some embodiments, the processor 210 may provide a web server such that configuration and maintenance may be provided over, for example, the LAN interface 240. The processor 210 may also provide direct access to the MNCPE 200, for example, through the use of input devices, such as a mouse or keyboard, and a display. In such embodiments, the processor 210 may include circuitry for controlling such input and display devices.

The processor 210 controls operation of the MNCPE 200 so that the use of the networks is controlled based on the characteristics of the networks and a session of a user utilizing the MNCPE 200. Thus, for example, the MNCPE 200 may control use of the DSL and cable networks by dividing or directing information between the networks for upstream communications and combining or otherwise directing communications for downstream communications to the appropriate interfaces, 240, 250, 260 and/or devices connected to the interfaces 240, 250, 260. This dividing, combining and directing may, in some embodiments, include the processor 210 reformatting or otherwise modifying communications or their content that are to be received from or transmitted to the networks. For example, the processor 210 may receive a digital signal from either the DSL or cable networks and convert the signal to an analog signal for distribution to an analog television connected to the video interface 250.

While particular components and interconnections of such components of an MNCPE 200 have been illustrated in FIG. 3, other and/or different components and/or interconnections may also be provided. For example, a universal serial bus (USB) connection could be provided to allow serial communications with a computer connected to the MNCPE 200. Likewise, additional or different interfaces could be provided. The particular interconnections between interfaces and/or the processor may likewise be altered based on the interface characteristics and/or use. Accordingly, embodiments of the present invention should not be construed as limited to the particular configuration illustrated in FIG. 3 but is intended to encompass other configurations capable of carrying out the operations described herein.

Figure 4:
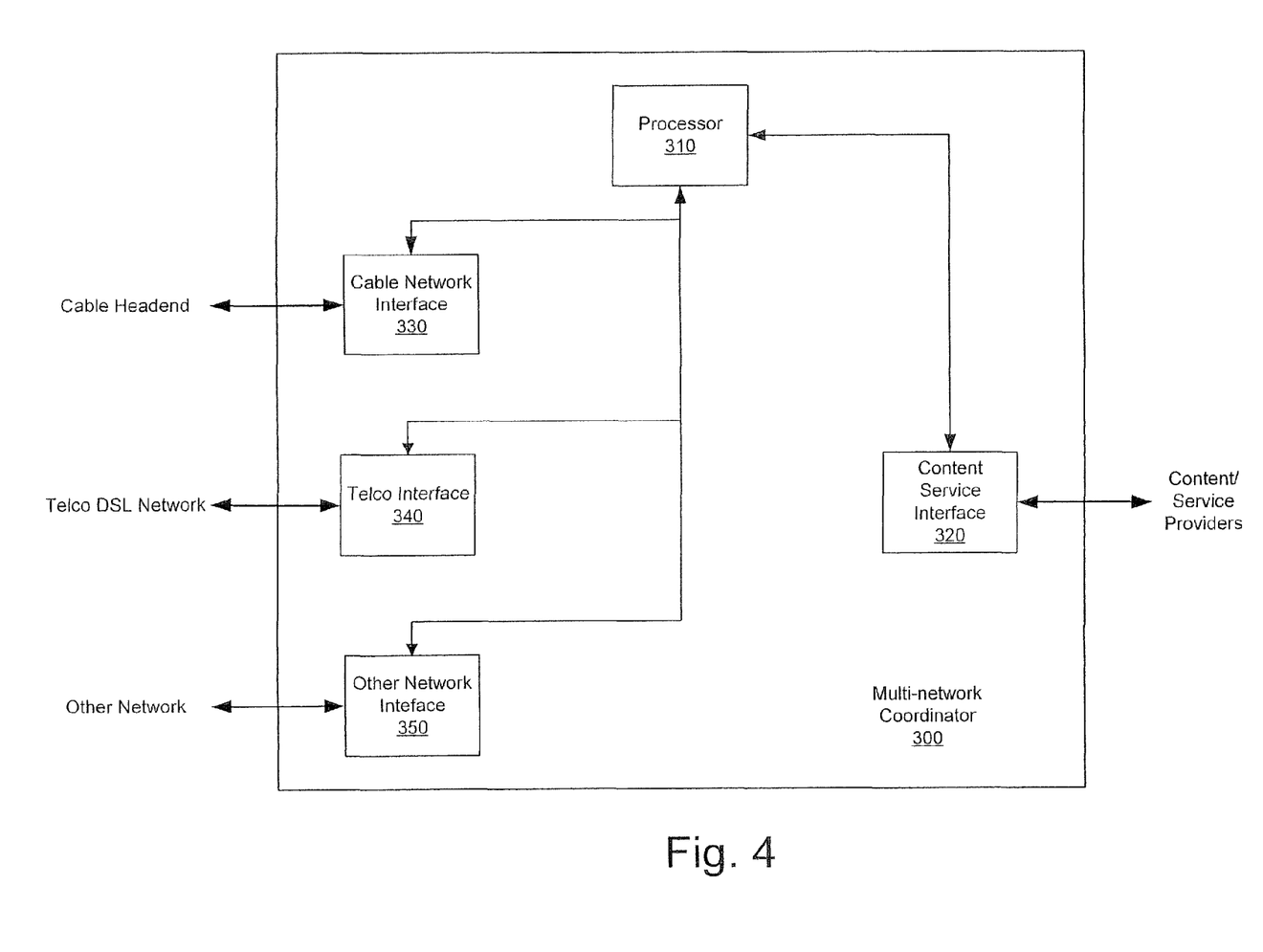
FIG. 4 is a more detailed block diagram of a multi-network coordinator according to some embodiments of the present invention.

FIG. 4 is a block diagram of a multi-network coordinator 300, such as the multi-network coordinator 40 of FIG. 1, according to some embodiments of the present invention. As seen in FIG. 4, a processor 310 coordinates the flow of communications to/from content and/or service providers, such as cable or satellite television content, Internet content or services or the like. The processor 310, may for example, include a microprocessor, digital signal processor, analog to digital converters, video and/or audio encoders and/or decoders, or other such hardware for converting between digital and analog video and/or audio as well as hardware to allow access to the processor over a LAN interface, USB interface or the like. The processor 310 may also include storage to, for example, buffer communications and/or provide workspace for transformations or the like. The storage may be volatile and/or non-volatile memory and may include storage devices such as hard drives or the like. In some embodiments, the processor 310 may provide a web server such that configuration and maintenance may be provided over, for example, a LAN interface. The processor 310 may also provide direct access to the multi-network coordinator 300, for example, through the use of input devices, such as a mouse or keyboard, and a display. In such embodiments, the processor 310 may include circuitry for controlling such input and display devices.

A content service interface 320 may be provided as one or more interfaces that allow communications with sources of content and/or services, such as the content/service providers discussed above. The particular configuration of the content service interface 320 may depend on the particular content/service provider and where the multi-network controller 300 is incorporated in the networks' infrastructure. In any event, the content service interface 320 allows communications between the processor 310 and the various content/service providers. The processor 310 may, however, pass through certain communications, such as particular video signals to the cable network interface 330 or data signals to the telco interface 340, as appropriate based on the coordinated use of the networks.

A cable network interface 330 is also provided and controlled by the processor 310. The cable network interface 330 allows the processor 310 to communicate with, for example, the cable headend 20 illustrated in FIG. 1. Thus, through the cable network interface 330 the multi-network coordinator may control the use of the cable distribution network. In some embodiments, the processor 310 may provide content and/or services received over the content service interface 320 to the cable distribution network using the cable network interface 330.

A telco interface 340 is also provided and controlled by the processor 310. The telco interface 340 allows the processor 310 to communicate with, for example, the Telco DSL network 30 illustrated in FIG. 1. Thus, through the telco interface 340 the multi-network coordinator may control the use of the DSL network. In some embodiments, the processor 310 may provide content and/or services received over the content service interface 320 to the DSL network using the cable network interface 340.

As is further illustrated in FIG. 4, other network interfaces 350 may also be provided to other networks. Such other network interfaces 350 may also be controlled by the processor 310 so as to control the use of the corresponding other networks.

In some embodiments, the content/services provided by various networks may be provided directly to the networks without passing through the multi-network controller 300. For example, television signals may be provided directly to a cable headend. However, the cable headend may be controlled by the multi-network controller to, for example, select the source signals that are distributed on the cable network and/or the channels on which the source signals are distributed. Thus, in some embodiments of the present invention, the cable network interface 330 may be provided as control interface to a cable headend.

The processor 310 may control operation of the multi-network coordinator 300 so that the use of the networks is controlled based on the characteristics of the networks and a session of a user. Thus, for example, the multi-network controller 300 may control information provided to a Telco DSL network and a cable distribution network by dividing or directing information between the networks for downstream communications and combining or otherwise directing communications for upstream communications to the appropriate interfaces, 330, 340, 350. This dividing, combining and/or directing may, in some embodiments, include the processor 310 reformatting or otherwise modifying communications or their content that are to be received from or transmitted to the networks. For example, the processor 310 may receive a digital signal from a content/service provider and convert the signal to an analog signal for distribution on the cable network.

While particular components and interconnections of such components of a multi-network coordinator 300 have been illustrated in FIG. 4, other components and/or interconnections may also be provided. For example, a universal serial bus (USB) connection could be provided to allow serial communications with a computer connected to the multi-network coordinator 300. Likewise, additional or different interfaces could be provided. The particular interconnections between interfaces and/or the processor may likewise be altered based on the interface characteristics and/or use. Accordingly, embodiments of the present invention should not be construed as limited to the particular configuration illustrated in FIG. 4 but is intended to encompass other configurations capable of carrying out the operations described herein.

While embodiments of an MNCPE 200 and multi-network coordinator 300 have been illustrated as a single, monolithic device, the MNCPE 200 and/or the multi-network coordinator 300 could be provided as multiple interrelated discrete devices.

Operations of the MNCPE 200 and the multi-network coordinator 300 will now be described generally with reference to the flowcharts of FIGS. 5 through 8. It will be appreciated by those of skill in the art in light of the present disclosure that specific operations to carry out the functions/operations illustrated in the flowcharts may be depend on the networks that are coordinated.

Figure 5:
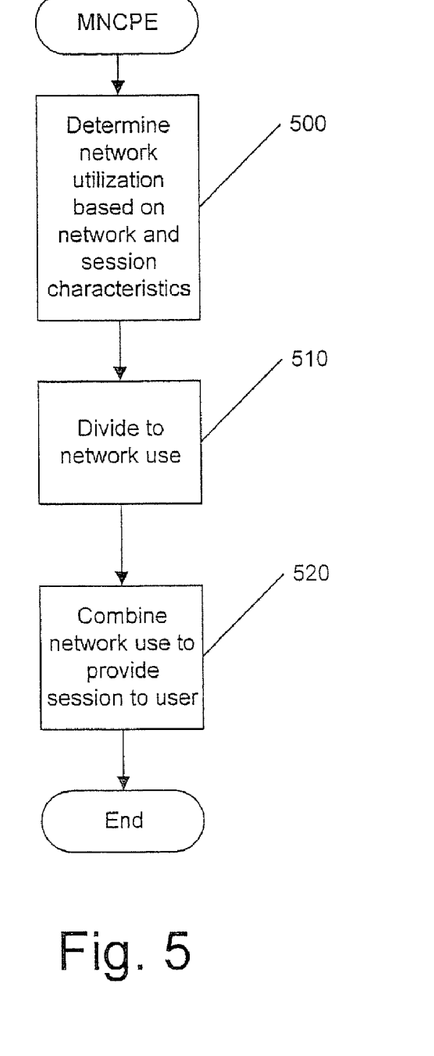
FIG. 5 is a flow chart of operations of multi-network customer premises equipment according to some embodiments of the present invention.

FIG. 5 illustrates operations of the MNCPE 200 for coordinating use of multiple networks. As seen in FIG. 5, the MNCPE 200 determines network utilization based on characteristics of the networks and characteristics of the session using the networks (block 500). Examples of session and/or network characteristics may include, for example, upstream and downstream bandwidth capability and/or utilization, latency, delay, synchronization and/or requirements, jitter (bit and/or packet), reliability (e.g., bit error rate) and/or other characteristics of the session or networks that may aid in determining an appropriate utilization of the networks. A description of network characteristics that may, for example, be found in The Irwin Handbook of Telecommunications, 4th edition, by James Harry Green, publisher McGraw Hill, (c)2000. Furthermore, cost of network usage, either financial or technical, may also be considered as a session and/or network characteristic. For example, if one of the controlled networks is a wireless network with a per packet charge, that network could be utilized for only selected types of session, such as high priority sessions or if other networks are unavailable or have a high utilization. Furthermore, network characteristics may be discovered, for example, by sending test packets with time stamps between the MNCPE 200 and the multi-network coordinator 300 to determine network characteristics such as latency. In such a case, the two devices may need to have synchronized clocks or other mechanism for having a common time reference for the time stamps. Similarly, a load test could be periodically performed to determine network characteristics.

The network utilization determination may be pre-configured in the MNCPE such that specific sessions utilize the networks in a predefined manner or may be dynamically determined, for example, taking into account network load or the like. The characteristics of the session may be determined by the MNCPE 200 monitoring the various interfaces and tracking activity to determine a group of related activities for the session. Alternatively or additionally, a session may be specified to the MNCPE 200, for example, through the use of an interface to the MNCPE 200. Thus, for example, a web page of possible activities could be provided by the MNCPE 200 to local devices and a user select an activity from the available selections. Furthermore, the determination of network utilization may be specified by the multi-network coordinator 300 and communicated to the MNCPE 200. Thus, in some embodiments of the present invention, the operations of block 500 are provided by receiving a communication that specifies the utilization of the networks. Thus, in some embodiments of the present invention, the determination of network utilization may be based on information in the session control protocol, using a Universal Resource Locator (URL), an Internet Protocol (IP) address or other identifier and/or may be determined dynamically by observing traffic characteristics.

The MNCPE 200 also divides communications to be sent from the MNCPE 200 among the networks based on the determined utilization of the networks (block 510) and combines communications from the networks to provide the session to the user (block 520). Accordingly, use of the multiple networks may be made transparent to the user. Furthermore, such division and combination may include changing formats of the communications as described above.

Figure 6:
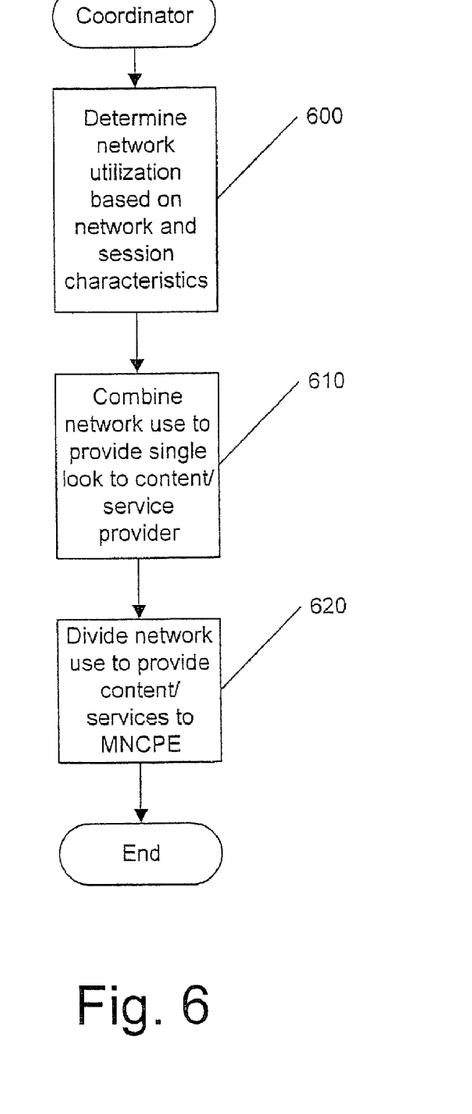
FIG. 6 is a flow chart of operations of a multi-network coordinator according to some embodiments of the present invention.

FIG. 6 illustrates operations of the multi-network coordinator 300 for coordinating use of multiple networks. As seen in FIG. 6, the multi-network coordinator 300 determines network utilization based on characteristics of the networks and characteristics of the session using the networks (block 600). This determination may be pre-configured in the multi-network coordinator 300 such that specific sessions utilize the networks in a predefined manner or may be dynamically determined, for example, taking into account network load or the like. The characteristics of the session may be determined by the multi-network coordinator 300 monitoring the content/services provided by the content/service providers. Alternatively or additionally, a session may be specified to the multi-network coordinator 300, for example, through the use of an interface to the multi-network coordinator 300. Thus, for example, a web page of possible activities could be provided by the multi-network coordinator 300 to a device at the customer premises and a user select an activity from the available selections. Furthermore, the determination of network utilization may be specified by the MNCPE 200 and communicated to the multi-network coordinator 300. Thus, in some embodiments of the present invention, the operations of block 600 are provided by receiving a communication that specifies the utilization of the networks. Thus, in some embodiments of the present invention, the determination of network utilization may be based on information in the session control protocol, using a Universal Resource Locator (URL), an Internet Protocol (IP) address or other identifier and/or may be determined dynamically by observing traffic characteristics.

The multi-network coordinator 300 also divides communications to be sent from the multi-network coordinator 300 among the networks based on the determined utilization of the networks (block 610) and combines communications from the networks to provide the session to the user (block 620). Accordingly, use of the multiple networks may be made transparent to the content/service providers. Furthermore, such division and combination may include changing formats of the communications as described above.

Figure 7:
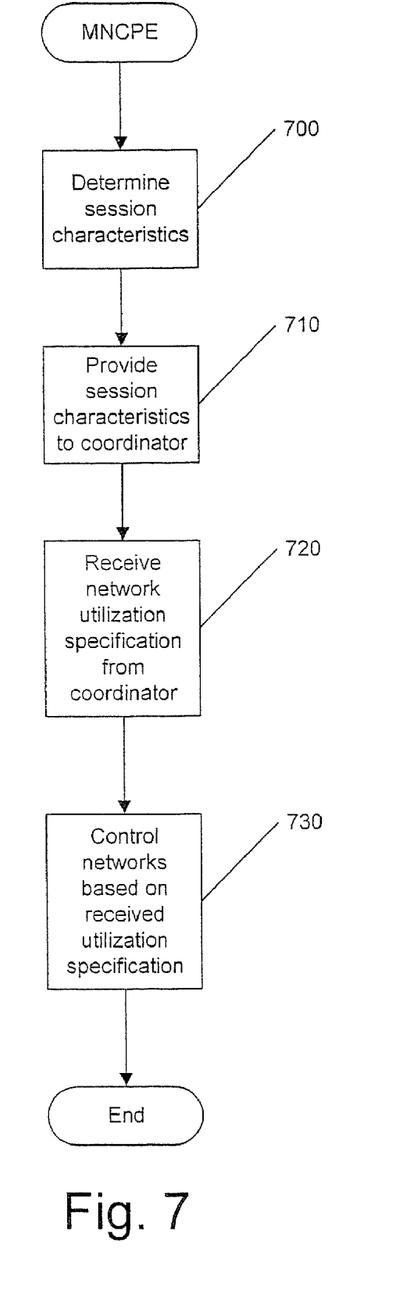
FIG. 7 is a flow chart of operations of multi-network customer premises equipment according to further embodiments of the present invention.

FIG. 7 is a flowchart illustrating operations according to further embodiments of the present invention. As illustrated in FIG. 7, the MNCPE 200 may determine characteristics for a session (block 700). As discussed above with reference to FIG. 5, this determination may be made inferentially, for example, by analysis of communications, and/or may be made explicitly, for example, by user selection of an activity with characteristics associated with the activity. Examples of session characteristics may include, for example, upstream and downstream bandwidth requirements, latency requirements, delay requirements, synchronization requirements, jitter (bit and/or packet) requirements, reliability (e.g., bit error rate) requirements and/or other characteristics of the session that may aid in determining an appropriate utilization of the networks. The MNCPE 200 provides the session characteristics to the multi-network coordinator 300 (block 710). The MNCPE then receives information from the multi-network coordinator 300 regarding the utilization of the networks (block 720) and the MNCPE 200 controls the networks accordingly (block 730). As discussed above, the control of the networks may include routing, dividing, combining and reformatting communications to/from the MNCPE 200.

Figure 8:
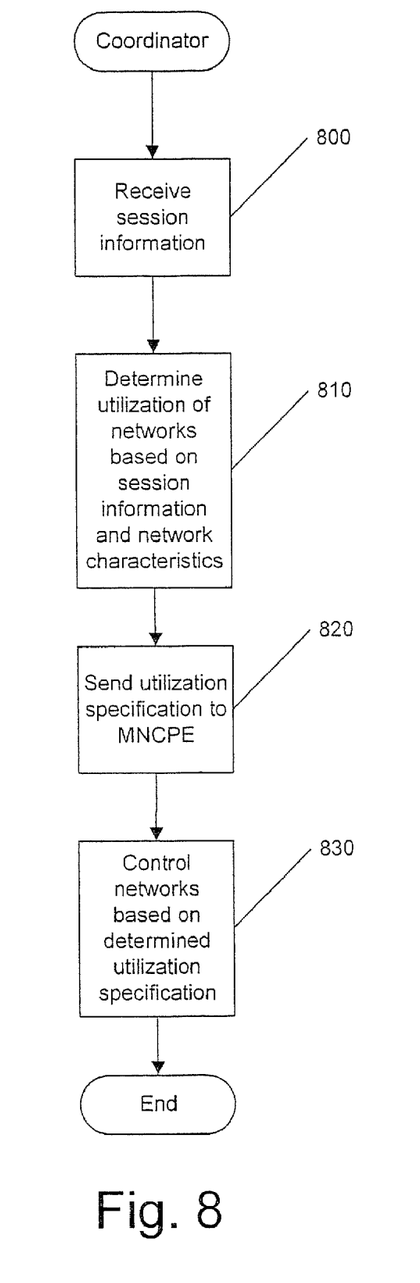
FIG. 8 is a flow chart of operations of a multi-network coordinator according to further embodiments of the present invention.

FIG. 8 is a flowchart illustrating operations according to further embodiments of the present invention. As illustrated in FIG. 8, the multi-network coordinator 300 receives characteristics for a session from the MNCPE 200 (block 800). The multi-network coordinator 300 determines how to utilize the networks based on the characteristics of the networks and the received session characteristics (block 810). This determination may be made statically, for example, by predefining utilizations based on identification of a session type, and/or may be made dynamically, for example, utilizing policies or other rules based on generated network characteristics and session characteristics. The multi-network coordinator 300 then sends the utilization specification to the MNCPE 200 (block 820) and the multi-network coordinator 300 controls the networks accordingly (block 830). As discussed above, the control of the networks may include routing, dividing, combining and reformatting communications to/from the multi-network coordinator 300.

Message exchanges as described with reference to FIGS. 7 and 8 may be carried out over the networks between the MNCPE 200 and the multi-network coordinator 300. For example, IP datagrams may be sent over the DSL network between the MNCPE 200 and the multi-network coordinator 300 that provides the session characteristic and network utilization information. Furthermore, the multi-network coordinator 300 and/or the MNCPE 200 may tag communications between each other with session identifiers to facilitate the combination of communications after transmission between the MNCPE 200 and the multi-network coordinator 300.

Figure 9:
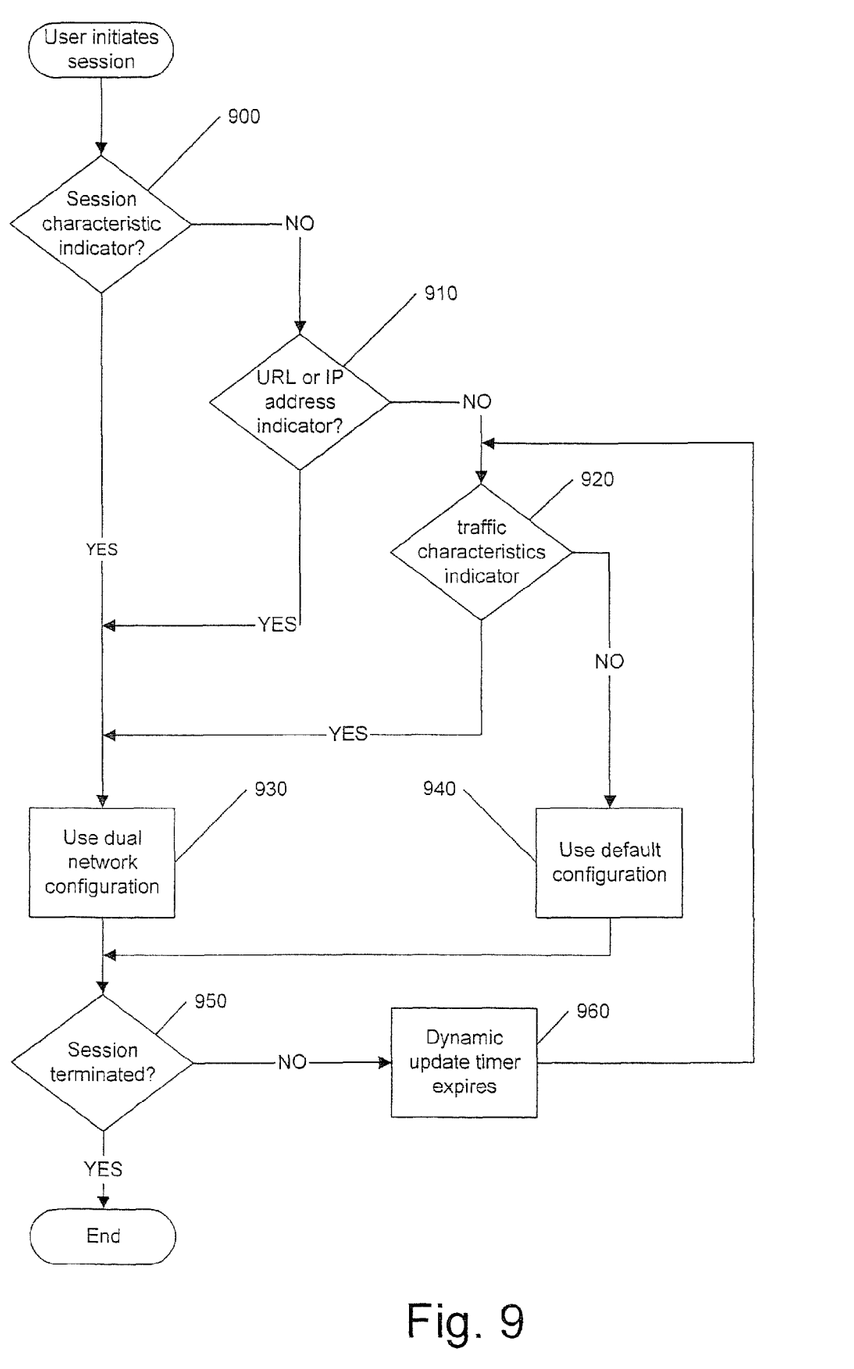
FIG. 9 is a flow chart of operations according to further embodiments of the present invention.

FIG. 9 is a flow chart illustrating operations according to further embodiments of the present invention. As seen in FIG. 9, when a user initiates a session, the session control protocol for the session may be evaluated to determine if the session control protocol indicates session characteristics on which the use of the networks may be controlled (block 900). Thus, for example, if the session control protocol indicates that the session is for a video conference, the networks may be controlled based on the characteristics of a video conference. If the session control protocol indicates session characteristics on which the use of the networks may be controlled (block 900), the networks are configured and utilized based on the session control protocol information (block 930).

If the session control protocol does not indicate session characteristics on which the use of the networks may be controlled (block 900), the URL and/or IP address may be evaluated to determine if they provide an indication on which the use of the networks may be controlled (block 910). For example, particular URL's or IP addresses may be associated with specific types of session, such as streaming video or the like, and the network utilization controlled based on this information. If the URL and/or IP address provide an indication on which the use of the networks may be controlled (block 910), the networks are configured and utilized based on the URL or IP address information (block 930).

If the URL and/or IP address does not provide an indication on which the use of the networks may be controlled (block 910), the traffic of the session may be observed and it determined if the traffic provides an indication of characteristics of the session on which the use of the networks may be controlled (block 920). If the traffic provides an indication of characteristics of the session on which the use of the networks may be controlled (block 920), the networks are configured and utilized based on the characteristic information from the traffic (block 930).

If the traffic does not provide an indication of characteristics of the session on which the use of the networks may be controlled (block 920), a default configuration of the networks may be used for the session. Furthermore, an initial configuration may be utilized for a session and then modified based on the determinations discussed above and a remainder or subsequent portion of the session controlled based on the session protocol information, the URL or IP address information and/or the traffic characteristics.

As is further illustrated in FIG. 9, the characteristics of a session may be periodically evaluated to determine of use of the networks should be modified. Thus, if the session has not terminated (block 950) and a dynamic update timer expires (block 960) the traffic characteristics may be evaluated to determine if a change in the use of the networks should be made as indicated by operations returning to block 920 to evaluate the traffic characteristics. Such a determination may be made independent of how the network utilization was originally determined or only if the network utilization was initially determined based on traffic characteristics.

While embodiments of the present invention have been described in FIG. 9 with the utilization of the network based on only on of session protocol characteristics, URL or IP address characteristics or traffic characteristics, such a determination could be based on two or more of session protocol characteristics, URL or IP address characteristics and/or traffic characteristics. Accordingly, embodiments of the present invention should not be construed as limited to the particular sequence of operations illustrated in FIG. 9.

In light of the above discussion, some or all of the components of the MNCPE 200 and/or the multi-network coordinator 300 may provide means for determining characteristics of a session to a user, means for controlling communications on at least two different networks and means for controlling the means for controlling communications based on characteristics of the at least two networks and the determined characteristics of the session to provide content and/or services for the session to the user over the at least two different networks. Thus, a multi-network coordination device may be provided by the multi-network customer premises equipment 200 and/or the multi-network coordinator 300.

Furthermore, some or all of the components of the MNCPE 200 and/or the multi-network coordinator 300 may provide means for controlling use of at least two different networks to deliver the content and/or services for the session to the user, wherein the at least two different networks have different data transfer characteristics and wherein the control of use of the at least two different networks is based on the data transfer characteristics of the at least two different networks and characteristics of the content and/or services for the session to the user.

Embodiments of the present invention have been described generally with reference to control of the use of the networks. Control of the use of the networks may include, for example, determining which communications are sent over which networks, determining how the communications are sent over the networks and/or determining when the communications are sent over the network. As used herein "communications" refers to the transfer of information over the network and may include digital and/or analog transfer. Thus, providing a television channel over the cable network may be communication over the network. Likewise, sending digital data over the network may be communication over the network.

The flowcharts and block diagrams of FIG. 1 through 9 illustrate the architecture, functionality, and operation of possible implementations of systems and methods according to various embodiments of the present invention. In this regard, a block or blocks in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A system for providing content for a session to a user, comprising:
a multi-network interface configured to communicate with at least two different networks to deliver the content for the session to the user, wherein the at least two different networks are each configured to deliver data to the user and are each configured to deliver the content for the session to the user, but have different data transfer characteristics; and
a controller configured to control use of the at least two different networks based on the data transfer characteristics of the at least two different networks and characteristics of the content for the session to the user;
wherein the controller is further configured to divide communications to deliver the content for the session to the user into a first type of communications to be communicated over a first of the at least two networks and a second type of communications to be communicated over a second of the at least two different networks; to communicate the first type of communications over the first network; and to communicate the second type of communications over the second network.

2. The system according to claim 1, wherein the at least two different networks comprise a cable television distribution network and a digital subscriber loop network.

3. The system of claim 1, wherein the controller is further configured to determine a characteristic of the session; and to select a predefined use of the networks based on the characteristic of the session, wherein the predefined use is established based on the characteristics of the networks.

4. A system according to claim 1 wherein the multi-network interface and the controller are both embodied in Customer Premises Equipment.

5. A system according to claim 1 wherein the multi-network interface and the controller are both embodied in a multi-network coordinator.

6. A system according to claim 1 wherein the multi-network interface is embodied in Customer Premises Equipment and wherein the controller is embodied in a multi-network coordinator that is outside the Customer Premises Equipment.

7. The system of claim 1, wherein the first type of communications control the delivery of the second type of communications.

8. The system of claim 7, wherein the controller is further configured to control receiving the first type of communications over the first network via the multi-network interface; to control receiving the second type of communications over the second network via the multi-network interface; and to control combining the first and second type of communications to deliver the content for the session.

9. The system of claim 1, wherein the at least one of the two networks comprises a digital subscriber loop network and wherein controlling use comprises controlling the allocation of upstream and downstream bandwidth for a digital subscriber loop network connection.

10. A system for providing content for a session to a user, comprising:
a multi-network interface configured to communicate with at least two different networks to deliver the content for the session to the user, wherein the at least two different networks have different data transfer characteristics; and
a controller configured to control use of the at least two different networks based on the data transfer characteristics of the at least two different networks and characteristics of the content for the session to the user;
wherein the controller is further configured to determine a characteristic of the session; to dynamically determine a characteristic of at least one of the networks when the session starts; to dynamically specify use of the networks when the session starts based on the characteristic of the session and the dynamically determined characteristic of the at least one of the networks when the session starts; to further dynamically determine a characteristic of at least one of the networks during the session; and to modify the use of the networks during the session based on the further dynamically determined characteristic of the at least one of the networks during the session.

11. The system according to claim 10, wherein the at least two different networks comprise a cable television distribution network and a digital subscriber loop network.

12. A system according to claim 10 wherein the multi-network interface and the controller are both embodied in Customer Premises Equipment.

13. A system according to claim 10 wherein the multi-network interface and the controller are both embodied in a multi-network coordinator.

14. A system according to claim 10 wherein the multi-network interface is embodied in Customer Premises Equipment and wherein the controller is embodied in a multi-network coordinator that is outside the Customer Premises Equipment.

15. A system for providing content, comprising:
a multi-network interface configured to communicate with at least two networks to deliver content for a session to a user, the at least two networks each being configured to deliver data to the user and each being configured to deliver the content for the session to the user, but having different data transfer characteristics and where the use of the at least two networks is controlled based on the data transfer characteristics of the at least two networks and characteristics of the session to the user; and
a controller configured to control the use of the at least two networks to provide the content for the session to the user;
wherein the use of the networks is dynamically established by the controller based on operating conditions of the networks when the session starts and characteristics of the session; and
wherein the use of the networks is further dynamically modified by the controller during the session based on operating conditions of the networks during the session.

16. The system according to claim 15, wherein the at least two different networks comprise a cable television distribution network and a digital subscriber loop network.

17. A system according to claim 15 wherein the multi-network interface and the controller are both embodied in Customer Premises Equipment.

18. A system according to claim 15 wherein the multi-network interface and the controller are both embodied in a multi-network coordinator.

19. A system according to claim 15 Wherein the multi-network interface is embodied in Customer Premises Equipment and wherein the controller is embodied in a multi-network coordinator that is outside the Customer Premises Equipment.

20. The system of claim 19:
wherein the multi-network coordinator comprises:
a content/services provider interface configured to communicate with content providers;
a cable network interface configured to communicate with a cable network distribution system;
a telco system interface configured to communicate with a digital subscriber loop network system; and
a processor configured to control communications between the content provider interface, the cable network interface and the telco system interface; and
wherein the Customer Premises Equipment comprises:
a cable modem;
a digital subscriber loop modem;
a local area network interface;
a video interface; and
a processor configured to control communications between the cable modem, digital subscriber loop modem, local area network interface and video interface.

* * * * *

UNITED STATES PATENT AND TRADEMARK OFFICE
CERTIFICATE OF CORRECTION

PATENT NO. : 7,920,580 B2  Page 1 of 1
APPLICATION NO. : 12/470068
DATED : April 5, 2011
INVENTOR(S) : Bedingfield, Sr.

It is certified that error appears in the above-identified patent and that said Letters Patent is hereby corrected as shown below:

In the Claims:
Column 18, Claim 19, Line 13: Please correct "claim 15 Wherein"
to read -- claim 15 wherein --

Signed and Sealed this
Second Day of August, 2011

David J. Kappos
*Director of the United States Patent and Trademark Office*